US 6,685,980 B2

(12) United States Patent
Strissel et al.

(10) Patent No.: US 6,685,980 B2
(45) Date of Patent: Feb. 3, 2004

(54) WHITE PROTEIN GLUTEN MEAL AND METHODS OF USE

(75) Inventors: Jerry F. Strissel, Harlan, IA (US); Michael John Stiefel, Panora, IA (US)

(73) Assignee: Syngenta Seeds, Inc., Golden Valley, MN (US)

( * ) Notice: Subject to any disclaimer, the term of this patent is extended or adjusted under 35 U.S.C. 154(b) by 0 days.

(21) Appl. No.: 10/224,297

(22) Filed: Aug. 20, 2002

(65) Prior Publication Data

US 2003/0104113 A1 Jun. 5, 2003

Related U.S. Application Data

(60) Provisional application No. 60/313,481, filed on Aug. 21, 2001.

(51) Int. Cl.[7] .............................. A23K 1/00; A01H 5/10
(52) U.S. Cl. ........................ 426/635; 426/807; 426/805; 426/2; 800/320.1
(58) Field of Search ................................ 426/635, 805, 426/807, 2; 800/320.1

(56) References Cited

U.S. PATENT DOCUMENTS

| 4,106,487 A | | 8/1978 | Randall et al. ............... 127/23 |
| 5,097,096 A | | 3/1992 | Williams .................... 800/200 |
| 5,900,528 A | * | 5/1999 | Bergquist ................... 435/410 |
| 6,242,674 B1 | * | 6/2001 | Bergquist ................... 435/412 |
| 6,313,328 B1 | * | 11/2001 | Ulrich et al. ............... 426/417 |
| 2001/0014750 A1 | * | 8/2001 | Ulrich et al. ................. 554/14 |

OTHER PUBLICATIONS

Stiefel, M., Z–Brand Gram; Fresh Facts about White Corn, vol. 1, Issue 1 [online]. Originally published Jan. 2000 [retrieved from the Internet: *http://www.zimmermanbrand.com/ZGram/zgram1.htm*].

Z–Brand Gram; Meet Our Specialty White Corn Team, vol. 1, Issue 1 [online]. Originally published Jan. 2000 [retrieved from the Internet: *http://www.zimmermanbrand.com/ZGram/zgram2.htm*].

\* cited by examiner

*Primary Examiner*—Chhaya Sayala
(74) *Attorney, Agent, or Firm*—Bruce Vrana

(57) ABSTRACT

The present invention provides a low phosphorous, low pigmented, highly digestible white protein meal to be used in feeding operations, especially aquaculture.

31 Claims, No Drawings

WHITE PROTEIN GLUTEN MEAL AND METHODS OF USE

CROSS REFERENCE

This application is related to U.S. provisional application filed Aug. 21, 2001 and having Ser. No. 60/313,481.

BACKGROUND OF THE INVENTION

The present invention relates to the novel use of a new, low phosphorus, low-pigmented (xanthophyll), highly digestible white protein gluten meal to be used as an ingredient in feeding operations, especially aquaculture. It is derived from the wet milling of an identity preserved, white corn hybrid with distinct characteristics. The development of this novel product involves several selection criteria across a variety of disciplines involving plant breeding, industrial processing, feeding operations, and environmental issues.

The publications and other materials used herein to illuminate the background of the invention or provide additional details respecting the practice, are incorporated by reference, and for convenience are respectively grouped in the appended Bibliography.

The goal of plant breeding is to develop new, unique, and superior corn inbred lines and hybrids. Typically, the development of a hybrid corn variety involves three steps: 1) the selection of plants from various germplasm pools for initial breeding crosses; 2) the selfing of the selected plants from the breeding crosses for several generations to produce a series of inbred lines, which, although different from each other, breed true and are highly uniform; and, 3) crossing the selected inbred lines with unrelated inbred lines to produce the hybrid progeny (F1). The breeder can theoretically generate billions of different genetic combinations via crossing, selfing, and mutations.

One of the most important tasks corn breeders have is to evaluate newly developed experimental materials. The difficulty in this task is to separate genetic and environmental effects. The usual procedure is to evaluate the material in performance trials conducted over two or three years at a minimum of six locations. More locations are preferred, but the resources available determine the number. Testing sites should be located in areas where the newly developed material is likely to be marketed.

Most plant breeders use a screening type of trial for eliminating genotypes that are obviously poor. Usually, large numbers of many genotypes are observed at a few locations. Sometimes, inoculations with prevalent leaf diseases and stalk rot pathogens are included. Those hybrids that survive rigorous testing are usually grown in larger strip tests for evaluation by farmers. If reaction is favorable, the selected hybrids are put into pilot seed production, and also entered in state variety trials before being placed into large-scale production.

Corn kernels can be altered by genetic means to give modifications in starch, protein, oil, pericarp thickness, kernel hardness, embryo size, kernel size, and color. This generates another set of testing parameters for products that are designed to be used by corn processors for specific value-added products or co-products.

Starch from normal dent or flint corn is composed of 73% amylopectin (the starch fraction with branched molecules) and 27% amylose (the fraction with linear molecules). Waxy corn (having the wx gene) was first found in China, but waxy mutations have also been found in American dent strains. Starch from this mutation is 100% amylopectin.

The endosperm mutant amylose-extender (ae) was found by R. P. Bear in 1950 (Vineyard et al., 1958). It increased the amylose fraction of the starch to 50% and above. The kernel of this corn is characterized by a tarnished, translucent, and partially full appearance. The ae gene, plus modifiers, gives a range in amylose content of 50–80%, but the amylose content can be stabilized at various intermediate levels.

Several endosperm mutants that alter the balance of amino acids have been identified. The most important of these is opaque-2. Mertz et al. (1964) reported that opaque-2 reduced zein in the endosperm and increased lysine. Other mutant genes with similar effects are floury-2 and opaque-7.

Kernels with the opaque-2 gene are characterized by a soft, chalky, nontransparent appearance, with very little hard vitreous or horney endosperm. This type of kernel is more prone to damage by kernel rots, insects, rodents, and harvesting machinery.

Another source of increased lysine and protein in single cross hybrids was discovered by Strissel et al. (U.S. Pat. No. 5,082,993). The increased nutritional levels were inherited in a dominant manner verses the recessive nature of the opaque-2 gene, and it was not a mutation. The inbred that was patented was derived from an exotic germplasm source, and not only increased protein levels, but the protein was also more digestible.

The mature corn kernel has four easily separable parts: tip cap, pericarp, endosperm, and germ. The major component of corn is starch, of which 98% is in the endosperm (Earle et al., 1946). On the whole kernel basis, starch content is 72–73%. The endosperm also contains 74% of the kernel protein, of which the majority is insoluble storage proteins.

The germ is the major depository of lipids, which amount to 83% of the total kernel lipids. The greater parts of the germ lipids are triacylglycerides, which, on extraction, give the well-known corn oil of commerce. The germ, being potentially metabolically active tissue, contains 70% of the kernel sugar and 26% of the kernel protein. Most of the germ proteins are albumins or globulins and probably are components of the enzymatic apparatus of the cells.

The corn germ is also rich in mineral elements that are essential for early growth of the embryo. The embryo contains 78% of the kernel minerals of which inorganic phosphorus is the most abundant. It is largely present as the potassium-magnesium salt of phytic acid-the hexaphosphate ester of inositol. Phytin is an important storage form of phosphorus (Hamilton et al., 1951; O'Dell et al., 1972), which is liberated by phytase enzymes to initiate embryo development. More than 80% of the phosphorus in corn is in the form of phytate. The corn germ contains nearly 90% of the phytate present in whole corn.

One of the problems associated with the use of grain and oilseed products in feed for monogastric animals, e.g. pigs, chickens, and fish, is the presence of phytate. Phytate phosphorus is nutritionally unavailable, and is excreted in the feces. It is then suspected of contributing to nutrient enrichment of several ecosystems when manure from confined animal rearing operations leaches into the ground and from there into lakes, streams, and bays.

In catfish rearing, excretion of phytate, which is degraded by microorganisms, thus releasing the bound phosphorus, contributes to algae growth in ponds. In trout farming, reducing the phosphorus levels of feeds over the past few years has greatly lowered the amount of soluble phosphorus excreted via urine, but little change has occurred in the amount of insoluble phosphorus excreted in the feces.

In trout feeds containing 1.6% total phosphorus, phytate phosphorus makes up 0.22% of total phosphorus. Feed manufacturers are reducing the amount of fish meal and replacing it with soy, wheat, and corn-based protein concentrates. These concentrates are lower in total phosphorus, but also lower in available phosphorus because of phytate. In a trout feed in which 2/3 of the fish meal is replaced with plant protein sources, phytate phosphorus could make up half or more of the total phosphorus in the feed, increasing fecal phosphorus loss.

Phytate has other possible effects on feed constituents mainly associated with its ability to interact directly and indirectly with certain minerals especially calcium, magnesium, zinc, and iron to reduce their availability to animals (Underwood, 1962; Momcilovic and Shahl, 1976). For example, calcium-bound phytate increases chelation with trace minerals, especially zinc, to form co-precipitates that make the zinc unavailable to the animal or fish.

Richardson et al. (1985) showed that zinc availability was greatly reduced to juvenile chinook salmon when sodium phytate was added to their feed, and that the fish developed cataracts as a result. In channel catfish, just 1.1% supplemental phytate in the feed increased the amount of zinc in the diet necessary to prevent deficiency signs by 10× over the amount needed in a semi-purified diet (Gatlin and Wilson, 1984).

Phosphorus content of common fish feed ingredients is highly variable. Some practical ingredients contain limited amounts of P (e.g. 0.3% P in blood meal) while other contain very significant levels (4–5% P in meat and bone meal) (NRC, 1993). Phosphorus contained in organic compounds, such as phospholipids and nucleic acids, are apparently highly digestible for fish. Phosphorus contained in phytate (inositol hexaphosphate), also an organic compound, is not digestible to fish since they lack the necessary enzyme (phytase). The digestibility of mineral forms of P, such as dicalcium phosphate, monosodium phosphate and rock phosphate, varies with degree of solubility of the compound(s) and is, consequently, highly variable (Lall, 1991). The digestibility of P contained in bone (apatite) is variable between fish species and depends mostly on stomach pH of the animal (Lall, 1991). For rainbow trout, a fish with a true (acid) stomach, apparent digestibility coefficient (ADC) of bone P appears to be between 40 and 60%. ADC of bone P appears to be much lower for stomachless fish, such as carp (Lall, 1991). Other factors, such as particle size, feed processing technique, and enzyme treatment, are also known to affect ADC of P (Lall, 1991).

Numerous studies have shown that dietary incorporation of microbial phytase improved the ADC of P of fish fed diets containing phytic acid (Rodehutscord and Pfeffer, 1995; Oliva-Teles et al., 1998; Vielma et al., 1998; Forster et al., 1999). The activity of this enzyme is affected by environmental temperature and its activity may be very limited at low water temperatures (Forester et al., 1999). Moreover, the enzyme is sensitive to heat and may be destroyed during pelleting and extrusion under standard commercial conditions.

Both digestibility and quantity will determine the fate of P fed to fish. The undigested fraction of the P of the diet is excreted in the feces by fish. The fraction of P digested by the animal is absorbed where it is deposited in the body of the fish (bones, scales, flesh, etc.) in the growth processes. A number of experimental evidences suggest that there is a requirement to maximize growth and maximize phosphorus deposition and bone mineralization. Phosphorus requirement of rainbow trout for maximum growth was 0.37% digestible P and 0.53% for maximum phosphorus deposition (Rodehutscord, 1996).

Fish receiving only the digestible P amount required to meet requirement for growth excrete only minute amounts of non-fecal P indicating that digestible P intake of the fish is directed almost completely toward deposition (Rodehutscord, 1996; Vielma and Lall, 1998; Bureau and Cho, 1999). There is evidence that efficiency of P utilization tends to decrease as digestible P level increase from the level required for maximum growth to the level required for maximum P deposition (Rodehutscord, 1996; Rodehutscord et al., 2000b). Interpretation of available data suggest that, while feeding a diet with digestible P at the level required to maximize growth results in minimal non-fecal P excretion, feeding with a diet with a digestible P level required that maximum P deposition results in significant non-fecal excretion.

Fish meal has been the main protein source used in feeds for farmed carnivorous fish since fish farming began. Fish meal is produced from stocks of fish not harvested for human consumption, and annual global production is 6.5 million metric tons (mmt) per year (Hardy and Green, 1999). Peru and Chile have traditionally accounted for approximately 35% of annual global production, utilizing anchovies and horse mackerel. Periodically, production from Peru and Chile declines by over 80%, in El Nino years when ocean temperatures and currents cause the fish stocks to move offshore, out of reach of the fishery. In years when this occurs, world production of fish meal declines, generally to 4–4.5 mmt, and the cost of fish meal increases to over $600/mt, double its lowest value. If other fish meal-producing countries are experiencing declines in their fisheries during El Nino years, the supply/demand situation becomes even worse.

When global fish meal production declines, feed producers turn to alternative proteins, such as rendered products and protein concentrates from grains and oilseeds. Among rendered products, poultry by-product meal, meat and bone meal, blood meal, and feather meal are utilized in animal and fish feeds. Soybean meal (de-hulled) is the main protein source from oilseeds that is used in animal feeds. Corn gluten meal is the main protein source from grains. Other substitutes include canola meal, soy protein concentrate, and wheat gluten, although price limits use of soy protein concentrate and wheat gluten (Hardy, 1999).

Feeds for aquatic animals now consume over 25% of global fish meal production each year, up from 10–12% eight years ago (Hardy, 1999). Poultry feeds use 50% of global production, swine 15%, and the remainder is used in pet feeds, rumen by-pass proteins, and minor species feeds. Continued growth of aquaculture is expected to increase the proportion of global fish meal used in feeds for fish and shrimp, according to projections. However, most observers assume the percentage of fish meal used in fish feeds will decrease. Underlying this assumption is the second assumption that alternative protein sources will substitute for fish meal. At present, feeds for three species groups in aquaculture account for 70% of fish meal use in aquaculture feeds: salmon, shrimp, and trout.

Yellow corn gluten meal has been evaluated as a fish meal substitute for fish with moderate success. Weede (1997) found that corn gluten could substitute for 25% of the fish meal in feeds for rainbow trout, but that 50% substitution or higher resulted in reduced feed intake and growth. Skonberg et al. (1998) reported that the use of over 15% corn gluten meal in trout feeds caused a yellowing of the flesh, and most trout feed manufacturers limit corn gluten meal to 5% in feeds or avoid it altogether. Corn gluten protein is reported to be relatively well digested by rainbow trout and Pacific salmon, but phosphorus availability is low (Sugiura et al., 1998), likely the result of phytate. Thus, what limits the use of corn gluten meal in feeds for salmonoids and shrimp is the presence of xanthophyll pigments and phytate. If these problems could be overcome, the potential market, at 25% use in the feed, is approximately 900,000 mt for salmon, shrimp, and trout. At least double this potential market exists in other species, notably European sea bass, gilthead sea bream, yellowtail, and various freshwater catfish species in Asia.

Yellow corn gluten meal is derived from the wet-milling process of corn. The primary products from the wet-milling process are food and industrial starches and sweeteners. Co-products include corn oil and the feed products corn gluten feed (CGF), corn gluten meal (CGM), corn germ meal, and condensed fermented corn extractives (steep liquor). The germ is solvent-extracted to recover oil, and the extracted germ meal is used in feed products. The gluten is separated from starch by centrifuges, giving a stream containing 69–72% (dry substance basis) total protein, which is dried to become 60% protein CGM. It is highly digestible, contains metabolizable energy (ME) of 4,131 kcal/kg of dry matter for the chick, and is rich source of available carotenes (49–73 mg/kg) and xanthophylls (244–550 mg/kg, dry substance basis). Its crude protein is highly digestible, a good source of methionine and cystine, but very low in lysine and tryptophan. The average phosphorus content of the yellow gluten meal is 0.78% (dry substance basis) (Corn: Chemistry and Technology, 1987). The solubles removed from the corn during steeping are concentrated by evaporation and are called steep liquor. The corn bran (fiber), corn germ meal, and the steep liquor are combined to form CGF with a typical protein content of 18–21%.

Normal yellow dent corn is the predominant corn processed. Its starch has 27% amylose, a linear glucose polymer, and 73% amylopectin, a branch-chain glucose polymer.

Flint corn, a variety of normal corn grown in South America, is processed successfully even though it does not soften much, even with 50–60 hours of steeping. Its starch yield is slightly less than regular corn, but its quality is good and the amylose-amylopectin ratio is the same as that of normal dent corn. No flint corn is processed in the United States.

Waxy corn, a genetic mutant, contains starch composed entirely of amylopectin. It can be processed in the same way as regular corn, with minor adjustments. The pasting temperature is lower, so the process must be cooler by about 3□ C. Separation of the starch and gluten is easier, but the starch yield is only 90% of that of regular corn. About 1.5% of the corn processed by wet milling in the United States is the waxy type.

Another genetic mutant variety that is processed commercially is high-amylose corn, with starch that is 60–70% amylose. Like waxy corn, the farmer must grow it in fields isolated from other varieties to prevent cross-pollination and then handle it separately after harvest to avoid contamination. Unlike the lower temperature for waxy corn, the processing temperature should be 3□ C. higher than that for regular corn. More steep time is required, starch-gluten separation and starch filtration are more difficult, and the starch yield is only 80–90% of that of regular corn. Only about 0.2% of the corn wet milled in the United States is the high-amylose variety.

White corn hybrids are mostly dry milled or used for other food products, and usually bred for hard endosperm, making them unsuitable for industrial wet milling purposes. A small quantity of white corn has traditionally been wet milled to produce specialty products with very bright whiteness. To be economically feasible, the value of the resultant specialty starch not only has to overcome the production premium but must also compensate for the decreased value of the gluten meal. A premium is paid in the U.S. market for gluten meal because the yellow carotenoids are desired by the poultry industry. The value of the pigmentation is considered to be $0.03–$0.07 per lb. of gluten meal or $0.08–$0.19 per bushel.

Traditionally, the dry and wet milling industries have selected varieties based on basic items such as kernel hardness, color, amount of stress cracks, thins, test weight, grit to germ ratio, density, and pericarp removal. All approved hybrids are typically collected and processed in a random manner.

SUMMARY OF THE INVENTION

The invention described herein relates to the novel use of a white protein gluten meal derived from the wet milling of one or more identity-preserved white corn hybrids with specific traits.

The present invention includes the use of a white protein gluten meal in the aquaculture feed industry with possible applications for additional livestock operations. The use of this new ingredient has implications on the quality of the meat, nutrient deposition in the meat, and potential positive environmental effects.

The present invention further includes selecting hybrid varieties of white corn that have specific grain components, for example, protein characteristics of the endosperm, starch characteristic, xanthophylls, phosphorus, and wet milling traits related to the separation and development of white protein gluten meal.

Thus, in a first aspect, the present invention is directed to white protein gluten meal having a phosphorus content in the range of about 0.30% to about 0.60%. The white protein gluten meal may also have a xanthophyll content of less than 80 mg/Kg in the range of about 2.5 mg/Kg to about 80.0 mg/Kg. The white protein gluten meal may further have a beta-carotene content of less than 3.0 mg/Kg with a range of about 0.03 to about 3.0 mg/Kg. Apparent digestibility coefficients (ADC) for the protein of the present invention are in the range of about 80.0% to about 96.0%. Finally, the white protein gluten meal has a crude protein content greater than 70% on a dry substance basis (DSB) in the range of about 70.0% to about 85.0%.

In a second aspect, the present invention is directed to a method for producing a white corn gluten meal comprising: a) selecting white corn grain having a total grain phosphorus content of less than 0.28%; and b) wet milling said grain to produce a white protein gluten meal. The white corn grain may also have a xanthophyll content of less than 5.3 mg/Kg with a range of between about 2.0 mg/Kg to about 5.3 mg/Kg. The white corn may further have a beta-carotene content of less than 0.10 ug/10 g with a range of between about 0.02 ug/100 g to about 0.10 ug/100 g. Finally, the white corn is selected such that the crude protein content after wet milling is greater than 70% (DSB) in the range of between about 70% to about 85%.

In a third aspect, the present invention is directed to an animal feed containing 1% to 60% white protein gluten meal. The animal feed preferably contains 12% to 24% white protein gluten meal. The animal feed more preferably contains 24% to 50% white protein gluten meal. The animal feed is particularly useful in applications that need a highly digestible protein source with increased availability of phosphorus, and the absence of xanthophyll pigments. One such application is aquaculture.

In a fourth aspect, the present invention is directed to a method for animal husbandry which comprises feeding animal feed containing 1% to 60% white protein gluten meal to an animal. The animal feed preferably contains 12% to 24% white protein gluten meal. The animal feed more preferably contains 24% to 50% white protein gluten meal. In a preferred embodiment, the animal husbandry is aquaculture.

In a fifth aspect, the present invention is directed to a method for reducing loss of phosphorus in an animal feeding operation comprising feeding animal feed containing 1% to 60% white protein gluten meal to an animal. The animal feed preferably contains 12% to 24% white protein gluten meal. The animal feed more preferably contains 24% to 50% white protein gluten meal. In a preferred embodiment, the animal feeding operation is aquaculture.

In a sixth aspect, the present invention is directed to a method for increasing phosphorus retention in animal flesh in an animal feeding operation comprising feeding animal feed containing 1% to 60% white protein gluten meal to an animal. The animal feed preferably contains 12% to 24% white protein gluten meal. The animal feed more preferably contains 24% to 50% white protein gluten meal. In a preferred embodiment, the animal feeding operation is aquaculture.

DETAILED DESCRIPTION OF THE PREFERRED EMBODIMENTS

The invention includes the use of a new ingredient, white protein gluten meal, in aquaculture feeding operations to replace fish meal as an alternative protein source that lowers total phosphorus input and increases phosphorus retention in the flesh. In addition, this product is nearly devoid of xanthophyll pigments, and generates white fish fillets verses the yellow pigmented fillets wherever yellow gluten is used at levels greater than 6%.

The following definitions are used herein.

Beta-carotene content: The total amount of beta-carotene. Beta-carotene has a 40 carbon base, and is the dominant provitamin A carotenoid in corn.

Corn Gluten Feed (CGF): A feed ingredient with a medium protein level and is palatable to all classes of livestock and poultry. CGF does not contain any gluten. It is comprised of the fiber fraction (bran), steep liquor, and, where available, germ meal. It commonly contains a minimum of 21% crude protein and approximately 15% starch.

Corn Gluten Meal (CGM): A feed ingredient that is the dehydrated protein stream resulting from starch separation in the endosperm fraction of the grain. It has a high nutrient density and usually is sold containing a minimum of 60% total protein. It is highly digestible, and is a rich source of carotenes (49–73 mg/kg) and xanthophylls (244–550 mg/kg).

Crude Protein Content: The total nitrogenous material in the plant substance. Protein=N×6.25.

Dry Substance Basis (DSB): Measurements are based on a zero moisture content basis.

Feed Efficiency (FE): As used herein, the feed efficiency in a feeding study is determined by dividing the wet weight gain by the dry feed intake. Diets with the highest number would have the best and highest feed efficiency.

Identity Preserved White Corn Hybrid with Specific Traits: White corn hybrid grain produced by a system where corn growers purchase a specific white corn hybrid, grow it in isolation to prevent contamination from yellow or a different white corn, dry the grain with a lower temperature to keep the grain temperature less than 140☐ F. and then store the grain in separate bins to maintain purity.

Phosphorus content: The total amount of the mineral element phosphorus. It is largely present as the potassium-magnesium salt of phytic acid—the hexaphosphate ester of inositol.

Phosphorus Deposition: The percent of phosphorus digested by an animal which is absorbed and is deposited in the body of the animal (bones, scales, flesh, etc.) in the growth processes. The undigested fraction of the P in the diet is excreted in the feces. "Phosphorus Deposition" has the same meaning as "Phosphorus Retention".

Protein Efficiency Ratio: As used herein, the protein efficiency ratio in a feeding study is the wet weight gain divided by the protein intake. The diets that utilized the protein in the diet the best would have the highest number.

Specific Growth Rate: As used herein, the specific growth rate is determined by dividing the weight gained by the number of days. Diets exhibiting the highest calculated number would have the best growth rate.

White Protein Gluten Meal: A protein feed ingredient derived by the wet milling of white corn hybrids in which the grain is typically separated into five separate segments consisting of protein, starch, fiber, embryo, and steep water. The white protein gluten meal is derived mainly from the endosperm fraction of the kernel and has protein levels higher than 70% (on a dry substance basis). This protein fraction is highly digestible, has low phosphorus with a range of about 0.30% to about 0.60%, and contains very low beta-carotene levels with a range of between about 0.03 mg/Kg to about 3.0 mg/Kg and/or low xanthophyll levels with a range of between about 2.5 mg/Kg to about 80 mg/Kg.

Xanthophyll content: The total amount of yellow carotenoid pigment.

The development of the white protein gluten meal is the result of identifying a specific white hybrid called 1851W that not only has special intrinsic grain traits, but also generates value-added co-products through industrial wet milling.

The corn hybrid, 1851W, is a proprietary single cross, white corn developed by Wilson Genetics, L.L.C. The hybrid was selected from various inbred crosses based upon one or more grain characteristics, e.g., color, yield, kernel hardness, cap smoothness, kernel size and shape uniformity, the protein characteristics of the endosperm, and the character of the starch. The intrinsic grain traits in 1851W includes higher grain protein levels ranges from about 9.3% to about 11.7%, dense starch that has a unique combination of 50.2% amylose and 49.8% amylopectin, increased endosperm protein (9.05%) that is very digestible, low endosperm phosphorus levels (0.07%), and high total dietary fiber (10.7%) on a dry substance basis. These traits can be selected in other white corn hybrids using conventional breeding techniques.

Contrary to the expectation that white corn performs poorly, if at all, in wet milling applications, the 1851W hybrid unexpectedly exhibited superior performance with standard wet milling methods. More specifically, the grain components of 1851W (starch, fiber, protein, and embryo) separated cleaner and easier than other white corn, and as well as many varieties of yellow dent corn, resulting in purer extracted products. It is believed that the superior performance of the 1851W hybrid with standard wet milling methods is due to the special grain traits of the 1851W hybrid. Other hybrids tested having these same special grain traits also have had superior performance with standard wet milling methods.

The deposition of minerals within the corn kernel is important when considering the separation of the kernel into components during the wet mill processing. In the 1851W grain, the endosperm contains 0.07% phosphorus while the embryo contains 0.79%. Consequently, if the embryo can be extracted intact and separated from the endosperm, then gluten, which is basically protein, derived from the endosperm, has a low phosphorus content.

The unexpected combination of the grain characteristics of 1851W, and with its wet milling attributes, has generated white protein products that have novel use applications in the feed industry.

EXAMPLES

Example 1

Wet Milling of Hybrid 1851W

Analysis of the white protein gluten meal of the present invention was prepared from wet milling 1851W at Colorado Sweet Gold, Johnston, Colorado and comparison to yellow corn gluten as shown in Table 1. This analysis was completed according to standard procedures used by the Experiment Station Chemical Laboratories, University of Missouri-Columbia, Columbia, Mo., in accordance with AOAC standards. The white protein gluten meal of the present invention has higher protein, less phosphorus, and very low xanthophyll and beta-carotene levels. The results in Table 1 do not include the embryo as it is cleanly extracted prior to the formation of the gluten meal. The values shown in Table 1 are based on a 9% moisture basis.

TABLE 1

Analysis of White Protein Gluten vs Standard Yellow Gluten

| Trait | White Protein Gluten | Yellow Gluten |
|---|---|---|
| Crude Protein (%) | 73.31–77.46 | 68.55–73.57 |
| Crude Fat (%) | 0.69–1.47 | 0.87–3.06 |
| Crude Fiber (%) | 0.60–0.80 | 0.60–0.92 |
| Ash (%) | 1.67–2.90 | 2.93–4.45 |
| ADF (%) | 2.30 | 0.96 |
| NDF (%) | 2.82 | 1.65 |
| Cellulose (%) | 2.15 | 1.93 |
| Phosphorus (%) | 0.36–0.58 | 0.67–0.98 |
| Beta-carotene (ug/100 g) | 104.0 | 345.0 |
| Xanthophylls (mg/lb) | 5.0–25.0 | 130.0–170.0 |

Example 2

Rainbow Trout Feeding Trials and Composition of Experimental Feeds

The phosphorus content of most fish meal sources ranges from about 2.7 to about 3.8% (Feedstuffs Ingredient Analysis Table: 2000 edition) while the phosphorus content of the white protein gluten meal of the present invention was 0.36%–0.58%. The white protein gluten meal of the present invention was incorporated into rainbow trout experimental diets at 6% incremental levels ranging from 0–36%. The effects of incorporating the white protein gluten meal on the phosphorus level of the diet are summarized in Table 2. In Table 2 and subsequent tables, the white protein gluten meal of the present invention is simply referred to as white protein.

TABLE 2

Proximate Composition (%) of Experimental Feeds On An As-Fed-Basis

| Treatment | Moisture | Crude Protein | Crude Lipid | Ash | Phosphorou |
|---|---|---|---|---|---|
| Fish Meal Control | 6.66 | 43.52 | 18.95 | 7.81 | 1.206 |
| White Protein - 6% | 7.46 | 42.49 | 18.32 | 7.86 | 1.116 |
| White Protein - 12% | 6.50 | 41.49 | 17.05 | 7.77 | 1.020 |
| White Protein - 18% | 6.59 | 42.26 | 17.87 | 7.72 | 0.941 |
| White Protein - 24% | 6.41 | 43.02 | 17.70 | 5.51 | 0.866 |
| White Protein - 30% | 6.14 | 43.17 | 18.89 | 6.34 | 0.752 |
| White Protein - 36% | 6.17 | 43.96 | 18.20 | 7.28 | 0.668 |

Example 3

Methods of Trout Feeding Trials and Weight Gain Results

The white protein gluten meal of the present invention was evaluated as a new feed inclusion ingredient in a replicated trial at the Hagerman Fish Culture Experiment Station, University of Idaho. Rainbow trout (average weight of 51 grams) were selected from a larger population, counted in groups of 30 fish, weighed, and placed into thirty 150 liter fiberglass tanks, each supplied with 4–6 l/min of untreated, constant temperature (14.5 C.), spring water. A domesticated strain of rainbow trout (House Creek strain, College of Southern Idaho) was used. A fixed photoperiod, controlled by timers and fluorescent lights, was followed (14-hrs daylight: 10-hrs dark).

The white protein gluten meal was examined in feeding trials utilizing practical fish feeds produced by cooking-extrusion at the Bozeman Fish Technology Center following feed formulations for rainbow trout described by Lovell (1998). White protein gluten meal was formulated into experimental feeds to replace fish meal in 6% increments, from 0–36%, yielding seven experimental diets. Additional three experimental diets were produced using yellow corn gluten meal to replace 6%, 12%, and 18% fish meal. Fish were fed to apparent satiation, three times per day, six days per week. Each diet was fed to triplicate tanks of trout, and the arrangement of the diets among tanks was in a completely randomized design.

Fingerling rainbow trout in the feeding trial were bulk-weighed and counted every three weeks and fish growth rates and feed conversion ratios were calculated from this data. Samples were taken for proximate and chemical analysis at the start from the common pool of fish, and at the end from each tank (5 fish per tank, pooled). Fish from each tank were ground, dried, and analyzed. Phosphorus in samples was determined according to Taussky and Shorr (1953). Data was transformed as necessary and analyzed for statistical significance using analysis of variance (ANOVA) using GraphPad Prism, version 2.0 (GraphPad Software, Inc., San Diego, Calif.). A significance level of $P<0.05$ was used and tank mean values were considered units of observation for statistical analysis.

Rainbow trout grew at a normal rate during the 12 week feeding trial, gaining about five times their initial weight in treatment groups exhibiting the highest weight gain. No significant differences were observed in weight gain between the fish fed the fish meal control diet (Diet 1) and those fed experimental diets containing white protein gluten meal up to 24% inclusion rate (Diet 5) as shown in Table 3.

TABLE 3

Weight Gain of Rainbow Trout Fed for 12 Weeks

| Dietary Treatment | Weight Gain (g) |
|---|---|
| Diet 1—Fish Meal Control | 264.0[a] |
| Diet 2—White Protein-6% | 254.7[a] |
| Diet 3—White Protein-12% | 240.7[ab] |
| Diet 4—White Protein-18% | 233.0[ac] |
| Diet 5—White Protein-24% | 226.7[ad] |
| Diet 6—White Protein-30% | 185.0[cde] |
| Diet 7—White Protein-36% | 190.3[bcdf] |
| Diet 8—Yellow Corn Gluten-6% | 257.7[a] |
| Diet 9—Yellow Corn Gluten-12% | 234.3[aef] |
| Diet 10—Yellow Corn Gluten-18% | 243.7[a] |

Example 4

Feeding Trials and Phosphorus Retention Results

Unexpectedly, phosphorus retention values exhibited a progressive and significant increase as herring meal was replaced by white protein gluten meal as shown in Table 4. Phosphorus retention in the fillets was the highest at the 36% white protein gluten meal inclusion rate at 50.4% that was significantly better than the fish meal control. It is significant to remember that the 36% white protein gluten meal inclusion diet had significantly less phosphorus than the control, but yet deposited more phosphorus. This clearly indicates that the phosphorus in the white protein gluten meal is more available and comes closer to the fish nutritional needs for deposition versus using fish meal.

TABLE 4

Phosphorus Retention Values for Fish Fed Experimental Diets

| Dietary Treatment | Phosphorus Retention (%) |
|---|---|
| Diet 1—Fish Meal Control | 32.1 ± 1.3[a] |
| Diet 2—White Protein-6% | 33.0 ± 1.8[a] |
| Diet 3—White Protein-12% | 40.3 ± 4.4[ad] |
| Diet 4—White Protein-18% | 38.5 ± 4.6[ad] |
| Diet 5—White Protein-24% | 41.9 ± 2.8[ad] |
| Diet 6—White Protein-30% | 47.0 ± 8.9[bcd] |
| Diet 7—White Protein-36% | 50.4 ± 4.3[bd] |
| Diet 8—Yellow Corn Gluten-6% | 33.4 ± 4.7[a] |
| Diet 9—Yellow Corn Gluten-12% | 35.7 ± 1.6[ac] |
| Diet 10—Yellow Corn Gluten-18% | 40.0 ± 1.7[ad] |

Example 5

Color of Fish Fillets from Feeding Trials

Surprisingly, marked differences were noted in the color of fish fillets between fish fed diets containing yellow corn gluten meal and those fed diets containing white protein gluten meal or the control diet. Minolta color readings of fish fillets supported visual observations of a distinct yellow hue in fillets of fish fed yellow corn gluten as shown in Table 5. Yellow coloration was noted throughout the fillets, from head to tail, and intensity of yellow color in fillets increased with the percentage of yellow corn gluten included in the diet.

TABLE 5

Minolta Colorimeter Values of Rainbow Trout Fillets Fillets from selected dietary treatment groups at the end of the feeding trial. Each fillet was read at three positions (head, middle, tail) above the lateral line (higher values indicate increased yellow hue)

| Dietary Treatment | Rep | Head | Middle | Tail |
|---|---|---|---|---|
| Diet 1—Fish Meal Control | 1 | 2.22 | 2.63 | 4.76 |
| Diet 1—Fish Meal Control | 2 | 1.73 | 1.59 | 5.28 |
| Diet 1—Fish Meal Control | 3 | 2.27 | 2.38 | 5.66 |
| Diet 2—White Protein-6% | 1 | 2.57 | 0.26 | 2.67 |
| Diet 2—White Protein-6% | 2 | 2.34 | 2.67 | 2.08 |
| Diet 2—White Protein-6% | 3 | 2.09 | 1.88 | 2.00 |
| Diet 2—White Protein-6% | 4 | 1.26 | −0.60 | 1.96 |
| Diet 7—White Protein-36% | 1 | 1.94 | 1.06 | 1.51 |
| Diet 7—White Protein-36% | 2 | 3.84 | 2.91 | 3.07 |
| Diet 7—White Protein-36% | 3 | 3.43 | 1.28 | 4.09 |
| Diet 7—White Protein-36% | 4 | 1.41 | 1.81 | 2.37 |
| Diet 8—Yellow Corn Gluten-6% | 1 | 3.85 | 4.76 | 9.13 |
| Diet 8—Yellow Corn Gluten-6% | 2 | 7.42 | 5.88 | 11.67 |
| Diet 9—Yellow Corn Gluten-12% | 1 | 10.23 | 10.22 | 11.06 |
| Diet 9—Yellow Corn Gluten-12% | 2 | 8.10 | 9.27 | 11.56 |

Example 6

Apparent Digestability Coefficients (ADC)—Methods and Results

Small batches of each experimental diet were ground, mixed with 1% chromic oxide and water, re-pelleted, and air-dried. Each diet was fed to two replicate tanks of fish for two weeks, and fecal samples were collected by stripping fish for three days per week, pooling fecal samples from each tank. Samples from each tank were analyzed, giving two replicate analyses per diet. Apparent digestibility coefficients (ADCs) for dry matter of diets containing white protein gluten meal of the present invention varied from 76.6% to 84.3%, with no particular trend associated with the level of white protein gluten meal in the diets as shown in Table 6. In contrast, ADCs for protein unexpectedly increased as the level of white protein gluten meal increased in the diets. ADCs for dry matter and protein of diets containing yellow corn gluten exhibited decreasing trends as the level of yellow corn gluten in the diet increased.

TABLE 6

In Vivo Apparent Digestibility Coefficients (ADCs) for the Experimental Diets

| Treatment | ADC Dry Matter | ADC Protein |
|---|---|---|
| Fish Meal Control | 73.7 | 88.5 |
| White Protein-6% | 76.6 | 89.7 |
| White Protein-12% | 76.7 | 90.5 |
| White Protein-18% | 83.4 | 92.4 |
| White Protein-24% | 77.2 | 91.7 |
| White Protein-30% | 77.5 | 91.3 |
| White Protein-36% | 84.3 | 93.3 |
| Yellow Corn Gluten-6% | 84.3 | 92.4 |
| Yellow Corn Gluten-12% | 79.8 | 90.7 |
| Yellow Corn Gluten-18% | 77.9 | 89.0 |

In a digestibility study, the same 1851W white protein gluten was compared directly to a Mexican source of corn gluten. Again, the results shown in Table 7 clearly indicate that the protein was unexpectedly highly digestible (97.5%), especially in comparison to the other source of gluten (80.9%).

TABLE 7

Apparent Digestibility Coefficients (ADCs) for 1851W Gluten verses Mexican Corn Gluten

| Nutrient | ADC (%) 1851W CG | ADC (%) Mexican CG |
| --- | --- | --- |
| Protein | 97.5 | 80.9 |
| Arginine | 97.9 | 61.5 |
| Aspartic Acid | 97.2 | 71.4 |
| Glutamic Acid | 95.4 | 84.4 |
| Glycine | 98.1 | 76.5 |
| Hisidine | 91.4 | 77.5 |
| Isoleucine | 95.3 | 83.5 |
| Leucine | 96.5 | 91.6 |
| Lysine | 100.0 | 69.5 |
| Methionine | 96.0 | 59.0 |
| Phenylalanine | 98.2 | 92.9 |
| Proline | 95.8 | 78.8 |
| Serine | 94.1 | 76.4 |
| Valine | 95.7 | 82.8 |

The white protein gluten meal of the present invention offers novel characteristics which are particularly useful as an alternate protein source in feeding operations that need a highly digestible protein source with increased availability of phosphorus, and the absence of xanthophyll pigments. One such feeding operation is in aquaculture. Currently there are no feeding systems that have access to a product with the above combination of traits.

Although the uses of the present invention have been disclosed primarily with respect to feeds for aquaculture, this is not deemed to limit the scope of this invention. The present invention may be used in other feeding operations where alternate protein sources are needed, where phosphorus utilization is important, and where there is potential to reduce phosphorus in the waste or effluents.

BIBLIOGRAPHY

Bureau, D. P. & Cho, C. Y. 1999. Phosphorus utilization by rainbow trout (*Oncorhynchus mykiss*): Estimation of dissolved phosphorus output. Aquaculture 179:127–140.

Earle, F. R. 1977. Protein and oil in corn: Variation by crop years from 1907 to 1972. Cereal Chem. 54:70–79.

Forster, I. et al. 1999. Potential for dietary phytase to improve the nutritive value of canola protein concentrate and decrease phosphorus output in rainbow trout (*Oncorhynchus mykiss*) held in 11 degrees C. fresh water. Aquaculture 179, 109–125

Gatlin, III, D. M. and Wilson, R. P., 1984. Zinc supplementation of practical channel catfish diets. Aquaculture 41, 31–36.

Hamilton, T. S. et al. 1951. The dependence of the physical and chemical composition of the corn kernel on soil fertility and cropping system. Cereal Chem. 28:163–176.

Hardy, R. W., 1999. Aquaculture□s rapid growth requirements for alternate protein sources. Feed Management, 50 (1): 25–28.

Hardy, R. W. and Green, J. A., 1999. How much feed does the world need? Aquaculture Asia, IV (1): 4–8.

Lall, S. P. 1991. Digestibility, metabolism and excretion of dietary phosphorus in fish. In: *Nutritional Strategies and Aquaculture Waste* (ed. by C. B. Cowey & Cho, C. Y.), pp. 21–36. Proceedings of the 1$^{st}$ International Symposium on Nutritional Strategies in Management of Aquaculture Waste, Guelph, Ontario, Canada.

Lovell, R. T., 1998. Nutrition and Feeding of Fish, 2$^{nd}$ Edition, R. T. Lovell (ed). Kluber Scientific Publishers, Boston, 267 pp.

Mertz, E. T. et al. 1964. Mutant gene that changes protein composition and increases lysine content of maize endosperm. Science 145:279–280.

Momcilovic, B. and Shahl, B. C. 1976. Femur zinc, magnesium, and calcium in rats fed tower rapeseed (*Brassica napus*) protein concentrate. Nutr. Rep. Int. 13:135–142.

O'Dell, B. L. et al. 1972. Distribution of phytate and nutritionally important elements among the morphological components of cereal grains. J. Agric. Food Chem. 20:718–721.

Oliva-Teles, A. et al. 1998. Utilization of diets supplemented with microbial phytase by seabass (*Dicentrarchus labrax*) juveniles. Aquatic Living Resources 11, 255–259.

Richardson, N. L. et al. 1985. Influence of dietary calcium, phosphorus, zinc and sodium phytate level on cataract incidence, growth, and histopathology in juvenile chinook salmon (*Oncorhynchus tshawytscha*). J. Nutr. 115, 553–567.

Rodehutscord, M. 1996. Response of rainbow trout (*Oncorhynchus mykiss*) growing from 50 to 200 g to supplements of dibasic sodium phosphate in a semi purified diet. Journal of Nutrition 126, 324–331.

Rodehutscord, M. and Pfeffer, E. 1995. Effects of supplemental microbial phytase on phosphorus digestibility and utilization in rainbow trout (*Oncorhynchus mykiss*). Water Science Technology 31,143–147.

Rodehutscord, M., Gregus, Z. & Pfeffer, E. (2000). Availability of phosphorus to rainbow trout *Oncorhynchus mykiss*. 1. Methodological considerations. IX International Symposium on Nutrition and Feeding of Fish, 21–25, Miyazaki, Japan. (Abstract 052).

Skonberg, D. I., Hardy, R. W., Barrows, F. T. and Dong, F. M., 1998. Color and flavor analyses of fillet from farm-raised rainbow trout (*Oncorhynchus mykiss*) fed low phosphorus feeds containing corn or wheat gluten. Aquaculture, 166: 269–277.

Sugiura, S. H. et al. 1998. Apparent protein digestibility and mineral availabilities in various feed ingredients for salmonid feeds. Aquaculture, 159: 177–202.

Taussky, H. H. and Shorr, E., 1953. A micro calorimetric method for the determination of inorganic phosphorus. J. Biol. Chem., 202:675–685.

Underwood, E. J. 1962. Trace Elements in Human and Animal Nutrition, 2$^{nd}$ ed. Academic Press, Inc., New York.

Vielma, J. and Lall, S. P. 1998. Control of phosphorus homeostasis of Atlantic salmon (*Salmo salar*) in fresh water. Fish Physiology and Biochemistry 19, 83–93.

Vielma, J. et al. 1998. Effects of dietary phytase and cholecalciferol on phosphorus bioavailability in rainbow trout (*Oncorhynchus mykiss*). Aquaculture 163, 309–323.

Vineyard, M. L. et al. 1958. Development of □Amylomaize□-Corn hybrids with high amylose starch: I. Genetic considerations. Agron. J. 50:595–598.

Weede N. 1997. Low phosphorus plant protein ingredients in finishing diets for rainbow trout (*Oncorhynchus mykiss*). M.S. thesis, University of Washington, Seattle, 147 pp.

What is claimed:

1. A white protein gluten meal having a phosphorus content between about 0.30% to about 0.60%.

2. The meal of claim 1 having a xanthophyll content of between about 2.5 mg/Kg to about 80 mg/Kg and a beta-carotene content of between about 0.03 mg/Kg to about 3.0 mg/Kg.

3. The meal of claim 1 having a crude protein content of between about 70% to about 85% on a dry substance basis.

4. A white protein gluten meal having a xanthophyll content of between about 2.5 mg/Kg and about 80.0 mg/Kg.

5. The meal of claim 4 having a phosphorus content of between about 0.30% to about 0.60%.

6. The meal of claim 4 having a beta-carotene content of between about 0.03 mg/Kg to about 3.0 mg/Kg.

7. The meal of claim 4 having a crude protein content of between about 70% to about 85% on a dry substance basis.

8. A white protein gluten meal having a beta-carotene content of between about 0.03 mg/Kg to about 3.0 mg/Kg.

9. The meal of claim 8 having a phosphorus content of between about 0.30% to about 0.60%.

10. The meal of claim 8 having a xanthophyll content of between about 2.5 mg/Kg and about 80.0 mg/Kg.

11. The meal of claim 8 having a crude protein content of between about 70% to about 85% on a dry substance basis.

12. A white protein gluten meal having a crude protein content of between about 70% to about 85% on a dry substance basis.

13. The meal of claim 12 having a phosphorus content of between about 0.30% to about 0.60%.

14. The meal of claim 12 having a xanthophyll content of between about 2.5 mg/Kg and about 80.0 mg/Kg. and a beta-carotene content of between about 0.03 mg/Kg to about 3.0 mg/Kg.

15. A method for producing a white corn gluten meal comprising:

a) selecting white corn grain having a total grain phosphorus content of between about 0.01% and about 0.28%, and b) wet milling said grain to produce a white protein gluten meal.

16. The method of claim 15, wherein said grain has a xanthophyll content of between about 2.0 mg/Kg to about 5.4 mg/Kg and a beta-carotene content of between about 0.02 ug/100 g to about 0.10 ug/100 g.

17. An animal feed comprising between about 1% to about 60% of white protein gluten meal.

18. The animal feed of claim 17 having between about 6% to about 25% white protein gluten meal.

19. The animal feed of claim 17 having between about 26% to about 50% white protein gluten meal.

20. A method for animal husbandry comprising feeding animal feed comprising between about 1% to about 60% white protein gluten meal to an animal.

21. The animal feed of claim 20 having between about 6% to about 25% white protein gluten meal.

22. The animal feed of claim 20 having between about 26% to about 50% white protein gluten meal.

23. The method of claim 20, wherein said animal husbandry is aquaculture.

24. A method for reducing loss of phosphorus in an animal feed operation comprising feeding animal feed containing 1% to 60% white protein gluten meal to an animal.

25. The method of claim 24, wherein said feed contains between about 6% to about 25% white protein gluten meal.

26. The method of claim 24, wherein said feed contains between about 26% to about 50% white protein gluten meal.

27. The method of claim 24, wherein said feeding operation is aquaculture.

28. A method for increasing phosphorus retention in animal flesh in an animal feeding operation comprising feeding animal feed containing between about 1% to about 60% white protein gluten meal to an animal.

29. The method of claim 28, wherein said feed contains between about 6% to about 25% white protein gluten meal.

30. The method of claim 28, wherein said feed contains between about 26% to about 50% white protein gluten meal.

31. The method of claim 28, wherein said animal feeding operation is aquaculture.

* * * * *

(12) EX PARTE REEXAMINATION CERTIFICATE (6152nd)
United States Patent
Strissel et al.

(10) Number: US 6,685,980 C1
(45) Certificate Issued: Mar. 11, 2008

(54) WHITE PROTEIN GLUTEN MEAL AND METHODS OF USE

(76) Inventors: Jerry F. Strissel, 1605 12th St., Harlan, IA (US) 51537; Michael John Stiefel, 4157 Panorama Dr., Panora, IA (US) 50216

Reexamination Request:
No. 90/006,965, Mar. 12, 2004

Reexamination Certificate for:
Patent No.: 6,685,980
Issued: Feb. 3, 2004
Appl. No.: 10/224,297
Filed: Aug. 20, 2002

Related U.S. Application Data

(60) Provisional application No. 60/313,481, filed on Aug. 21, 2001.

(51) Int. Cl.
*A23K 1/00* (2006.01)
*A01H 5/10* (2006.01)

(52) U.S. Cl. ............ 426/635; 426/2; 426/805; 426/807; 800/320.1

(58) Field of Classification Search ............ None
See application file for complete search history.

(56) References Cited

U.S. PATENT DOCUMENTS

| | | | | |
|---|---|---|---|---|
| 5,459,162 A | * | 10/1995 | Saxton | 514/499 |
| 5,512,090 A | * | 4/1996 | Franke et al. | 106/126.1 |
| 6,723,370 B2 | * | 4/2004 | Ulrich et al. | 426/622 |
| 6,726,941 B2 | * | 4/2004 | Ethington et al. | 426/2 |
| 6,935,584 B2 | * | 8/2005 | Strissel et al. | 241/9 |
| 2003/0066106 A1 | * | 4/2003 | Strissel et al. | 800/284 |

OTHER PUBLICATIONS

New Developments in Aquatic Feed Ingredients, and Potetial of Enzyme Supplements. Author: Hardy. Simposium Internacional de Nutricion Acuicola. Published 2000.*

Food and Agriculture Organization of the United Nations Website. Animal Feed Resources Information System: Zea Mays. [online] Available online May 10, 2001. [retrieved from the Internet: http://www.fao.org/livestock/aga/agap/frg/afris/Data/549.HTM].*

Opinion of the Scientific Committee on Animal Nutrition. Dioxin Contamination of Feedingstuffs and Their Contribution to the Contamination of Food of Animal Origin. Published 2000. p. 38.*

Iowa Corn Promotion Board. Identifying Valuable Corn Quality Traits for LIvestock Feed. Johnson et al. Published Nov. 1999.*

The Midwest Feeds Consortium—Final Report. Ostrowski et al. Published Jan. 1999.*

Corn Gluten Feed. Composition and Feeding Value for Beef and Dairy Cattle. Kansas State University. Published Feb. 2001.*

Z–Brand Gram: Meet Our Specialy White Corn Team, vol. 1, Issue 1 [online]. Originally published Jan. 2000 [retrieved from the Internet: http://www.zimmermanbrand.com/ZGram/zgram2.html].*

T.W. Crowe, S.K. Singh, and L.A. Johnson, "Wet–Milling Properties of 20 White Corn Hybrids", Center for Crops utilization Research. Iowa State University, Ames, Iowa 50011.*

William L. Pearce, C.G. Poneleit, and Philip Shine, 1999 Kentucky Hybrid Corn Performance Test, pp. 1–32, Agricultural Experiment Station, University of Kentucky, College of Agriculture.*

Darrah et al, *White Food Corn: 1999 Performance Tests* Agricultural Research Service, U.S. Department of Agriculture; Agricultural Experiment Station, University of Missouri–Columbia; Special Report 528, 12/99/2.4M.

Zimmerman Brand [brochure], "White Corn; 1999–2000", Wilson Genetics, L.L.C.

* cited by examiner

*Primary Examiner*—Jerry D Johnson

(57) ABSTRACT

The present invention provides a low phosphorous, low pigmented, highly digestible white protein meal to be used in feeding operations, especially aquaculture.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–31 are cancelled.

* * * * *